United States Patent
Sun et al.

(10) Patent No.: US 6,810,016 B1
(45) Date of Patent: Oct. 26, 2004

(54) TRUNKING ALARM AGGREGATION METHOD AND APPARATUS

(75) Inventors: Haibin Sun, Fremont, CA (US); Michael E. Tasker, Pleasanton, CA (US); Patrik L. Buckingham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/567,562

(22) Filed: May 5, 2000

(51) Int. Cl.[7] .............................. H04J 1/16; H04J 3/14
(52) U.S. Cl. ...................................... 370/241; 370/248
(58) Field of Search ................................ 370/241, 253, 370/352, 401; 340/506, 242, 243, 244, 245, 246, 247, 248

(56) References Cited

U.S. PATENT DOCUMENTS

| | | | | |
|---|---|---|---|---|
| 5,636,203 A | * | 6/1997 | Shah | 370/244 |
| 5,701,293 A | * | 12/1997 | Fujii | 370/244 |
| 5,936,942 A | * | 8/1999 | McNeley et al. | 370/244 |
| 5,991,264 A | * | 11/1999 | Croslin | 370/225 |
| 6,097,699 A | * | 8/2000 | Chen et al. | 370/231 |
| 6,366,556 B1 | * | 4/2002 | Ballintine et al. | 370/216 |
| 6,484,202 B1 | * | 11/2002 | LeDuc et al. | 709/224 |
| 6,507,561 B1 | * | 1/2003 | Baniewicz et al. | 370/216 |
| 6,618,358 B2 | * | 9/2003 | Mahajan et al. | 370/242 |
| 6,657,970 B1 | * | 12/2003 | Buckingham et al. | 370/249 |

* cited by examiner

Primary Examiner—Ajit Patel
(74) Attorney, Agent, or Firm—Marger Johnson & McCollom, P.C.

(57) ABSTRACT

In a telephony voice network having at least two connectable endpoint nodes with a trunk therebetween and a trunking alarm associated with each endpoint node, an alarm aggregation method is proposed. The method involves first detecting a trunking alarm associated with one of the endpoint nodes and second detecting a second trunking alarm associated with another of the endpoint nodes. The method aggregates the results of the first and second detecting to assist in determining a condition of the trunk between the two endpoint nodes. Such an out-of-service condition of the trunk may be signaled onto an outgoing T1/E1 connection coupled with the affected trunk. Preferably, plural connectable endpoint node pairs define plural ones of such trunks therebetween with each of the plural trunks having a trunking alarm associated with each endpoint node pair. In such a case, the first and second detecting and the first aggregating are performed for each of the plural trunks, and the method further involves second aggregating the plural results of the plural instances of the first aggregating. Invented alarm aggregation and conditioning apparatus preferably includes a trunk group including plural dedicated endpoint node pair connections, each endpoint node pair connection including a bi-directional alarm signaling mechanism, with the trunk group generating one or more alarms from each alarm signaling mechanism. The apparatus further includes an alarm aggregation mechanism coupled with the trunk group for aggregating one or more alarms generated by the trunk group into a trunk group alarm representing the condition of the trunk group.

11 Claims, 4 Drawing Sheets

TRUNKING ALARM AGGREGATION METHOD AND APPARATUS

BACKGROUND OF THE INVENTION

This invention relates to alarm signaling between endpoints of a telephone line or trunk, and more specifically to a method of aggregating alarm conditions of plural ones of such telephone lines or trunks and using the aggregated alarm for reporting, logging, maintenance and/or re-routing purposes.

Voice T1/E1 connections include wires carrying data representing voice signals. A normal voice T1 connection, for example, may be used for direct connection to a standard PBX. Such typically would carry a fixed set of twenty-four digitized voice channels (thirty for the higher-bandwidth E1 connection) with each channel having its own allotted, fixed "timeslot" with one byte of digitized voice being transmitted for each channel in turn. The allocation is fixed, so that even when there is no active telephone call in progress, the voice channel bandwidth is unavailable for other purposes. Such voice T1/E1 connections are sometimes referred to as "channelized" T1/E1 connections. Accordingly, the present invention relates to T1/E1 connections used to directly carry telephone voice signals to a PBX in a conventional time-division-multiplex (TDM) manner.

Signaling among endpoints of such trunks may be in accordance with international standards such as the FRF.11 specification promulgated by the Frame Relay Forum and the ATM AAL2 specification promulgated by the ATM Forum. The FRF.11 specification provides a mechanism for line or trunk state signaling. It does so by reserving an alarm indication signal (AIS) bit for alarm signaling associated with a given endpoint of a single voice bearer VoFR channel. The FRF.11 specification contains no suggestion how an alarm condition might be defined or used in a network application.

SUMMARY OF THE INVENTION

In a T1/E1 telephony voice network having at least two connectable endpoint nodes, e.g. PBXs, with a trunk therebetween and a trunking alarm associated with each endpoint node, an alarm aggregation method is proposed. The method involves first detecting a trunking alarm associated with one of the endpoint nodes and second detecting a second trunking alarm associated with another of the endpoint nodes. The results of the first and second detecting are aggregated to determine a condition of the trunk between the at least two connectable endpoint nodes. Preferably, the first aggregating includes performing a logic combination of the results of the first and second detecting. The method may further involve signaling a determined out-of-service condition of the trunk onto an outgoing T1/E1 connection coupled with the affected trunk. Preferably, plural connectable endpoint node pairs define plural ones of such trunks therebetween with each of the plural trunks having a trunking alarm associated with each endpoint node pair. In such a case, the first and second detecting and the first aggregating are performed for each of the plural trunks and the method further involves second aggregating the plural results of the plural instances of the first aggregating. This enables a determination of a condition of the plural trunks between the plural connectable endpoint node pairs.

The invented apparatus is for alarm aggregation and conditioning of a voice T1/E1 connection. The apparatus preferably includes a trunk group including plural dedicated endpoint node pair connections, each endpoint node pair connection including a bi-directional alarm signaling mechanism, the trunk group generating one or more alarms from each alarm signaling mechanism. The apparatus further includes an alarm aggregation mechanism coupled with the trunk group for aggregating one or more alarms generated by the trunk group into a trunk group alarm representing the condition of the trunk group.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1A:
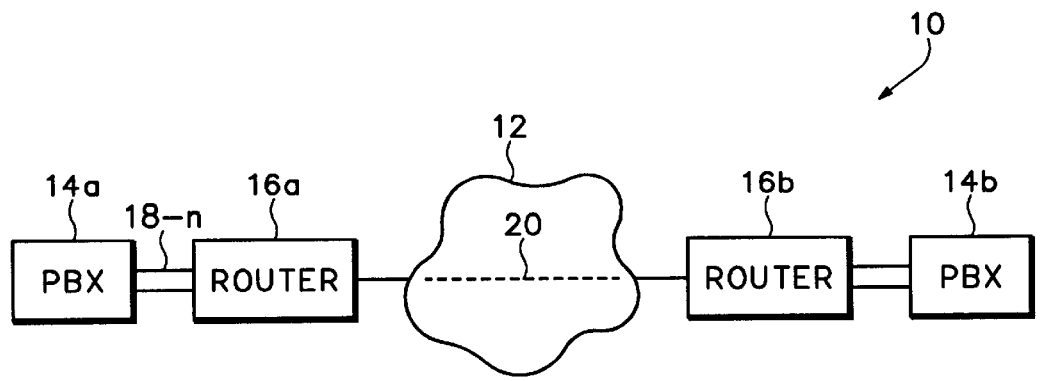
FIGS. 1A through 1D are system block diagrams illustrating a voice packet network system providing trunking alarm aggregation in accordance with four different embodiments of the invention.

FIG. 1A illustrates the invented apparatus 10 coupled with a frame relay network 12 (which will be understood to be represented amorphously, with respect to configuration and span) operating with respect to voice traffic thereon in accordance with a given digitized voice protocol such as time-division-multiplex (TDM). Network 12 typically includes one or more phones (not shown in FIG. 1A) typically connected with one or more PBXs 14a, 14b, which PBXs 14 may be thought of as representing so-called endpoint nodes within network 12. Those of skill in the art will appreciate that each PBX 14, e.g. PBX 14a, PBX 14b, typically is coupled via a router 16 within network 12. Each router 16 will be understood typically to include facilities that digitize and multiplex voice signals from the handsets for routing voice traffic over network 12.

Under such a protocol, voice traffic often is handled by so-called trunks. In the context of the present invention, a trunk will be understood to refer to a single dedicated voice channel. Typically there are plural trunks that are closely coupled with one another on a given T1/E1 line or connection, by which term broadly is meant a voice T1 or a voice E1 connection, a combination T1 and E1 connection or any suitable equivalent. Such plural trunks are indicated as double lines in FIG. 1A as 18-n, where n is understood typically to be twenty-four. Closely coupled trunks or trunk lines will be referred to herein as a trunk group. Known TDM protocols (as well as related specifications such as FRF.11) govern the way in which digitized voice traffic is routed among the phones, PBXs 14 and routers 16 over trunks 18-n. A single frame relay private voice channel (PVC) 20 carries digitized voice signals over twenty-four FRF.11 sub-channels between routers 16a, 16b, as indicated.

For example, FRF.11 reserves an alarm indicator signal (AIS) bit in one of its supervisory or control frames. The present invention utilizes the AIS bit as an indicator of an alarm condition prevailing at one endpoint node of a trunk such as an individual trunk 18-1 (not explicitly shown in the drawings). Those of skill in the art will appreciate that an alarm condition, in accordance with the invention, may be defined to include any condition of a trunk endpoint that impairs normal voice traffic into or out of that endpoint. For example, a line may be down as a result of a hardware failure. Or a PBX 14 may because of a computer disc crash or power failure be unable to route calls to and from its connected phones. One or more codecs (also not explicitly shown in the drawings) may fail to operate and switching to a different codec may not sufficiently remedy the voice traffic impairment. Any such condition may, within the spirit and scope of the invention, give rise to what will be referred to herein as a trunking alarm condition and the assertion of the respective AIS bit in accordance with the FRF.11 specification.

In accordance with the invention, apparatus 10 aggregates one or more associable trunking alarm conditions, thereby ascertaining and, if possible, remedying, the impaired condition of one or more trunks or trunk groups. Apparatus 10 will be understood preferably to be implemented in software resident at plural endpoint nodes. As used herein, endpoint nodes refers broadly to a logic node that multiplexes (e.g. fans-in or fans-out) plural voice data packets. In other words, plural instances of apparatus 10 typically would reside within corresponding (but not necessarily in one-to-one relationship) plural ones of PBXs 14 or routers 16, as indicated in FIGS. 1A through 1D.

Briefly summarizing, apparatus 10 preferably includes a trunk group 18-n including plural (n) dedicated endpoint node pair connections such as that seen in FIG. 1A to extend between PBXs 14a, 14b. Each endpoint node pair connection includes a unidirectional alarm detection mechanism, the trunk group generating one or more alarms from each alarm signaling mechanism. It will be appreciated by those skilled in the art that, although each alarm detection mechanism is only unidirectional (in accordance with the FRF.11 specification), nevertheless there is bi-directional alarm detection capability in accordance with the invention. This is by virtue of the intelligence placed at each node in the network. Preferably, then, each node receives a unidirectional alarm detection signal in accordance with the AIS bit defined by the FRF.11 specification and determines based in part thereon and in part by the self-determined condition of its own corresponding T1/E1 connection whether a bi-directional alarm condition exists.

The logical predicates for setting an (outgoing) AIS bit at the originating end include: a) an incoming digital T1/E1 connection indicates an alarm; b) an incoming analog FXO subscriber line connection has no detectable battery voltage for a predetermined period of time; c) monitoring of the Frame Relay network connection shows congestion/packet loss for (prioritized) outgoing voice packets, i.e. voice packets prioritized higher than general-purpose data packets carried on the same interface; d) monitoring of the incoming voice packet stream indicates significant packet loss that would lead to poor voice quality; e) hardware resource failure within the router, e.g. the DSP resource used to compress the voice channel fails; or f) the phone ports are deliberately configured for an OOS state.

Complementarily, the logical predicates, for determining an (incoming) OOS state at the terminating end include: a) AIS bit set in the incoming FRF.11 Annex B packets; b) timeout on reception of incoming packets; c) monitoring of the Frame Relay network connection shows congestion/packet loss for (prioritized) outgoing voice packets, i.e. voice packets prioritized at a higher level than general-purpose packets carried on the same interface; d) monitoring of the incoming voice packet stream indicates significant packet loss that would lead to poor voice quality; e) hardware resource failure within the router, e.g. the digital signal processor (DSP) resource used to compress the voice channel fails; f) the phone ports are deliberately configured for an OOS state; or g) an alarm/OOS indication on the Frame Relay connection interface.

Those of skill in the art will appreciate that an incoming AIS signal is not used to cause an outgoing AIS, since this would create a deadlock situation. Those of skill also will appreciate that the OOS conditions are accumulated for all voice channels sharing the same onward T1/E1 voice connection to the PBX. If more than a programmable number of voice channels are in the OOS condition, then the PBX T1/E1 voice connection is forced into an alarm state. Typically, in accordance with the invention, when a blue alarm is forced onto the outgoing PBX T1/E1 voice connection, the PBX will acknowledge the blue alarm state by returning a yellow alarm. Logic is implemented in the router, according to the invention, so that if an incoming yellow alarm is present accompanying and outgoing blue alarm, e.g. due to AIS reception, then the outgoing AIS state is not set, thereby to avoid a deadlock.

A five second keep-alive period specified by the FRF.11 specification for sending repeat (unchanged) FRF.11 Annex B packets can be configured to a shorter or longer time in order to control the amount of time required to detect a timeout on FRF.11 Annex B packet reception. For example, with the keep-alive period set to the standard five seconds, a period of 10–15 seconds would be a reasonable minimum for the timeout. If a shorter timeout is desired, then the keep-alive period should be reduced, e.g. to 1–2 seconds.

Any such logic implementations under FRF.11 Annex B as described above are contemplated, and are within the spirit and scope of the invention.

Figure 1C:
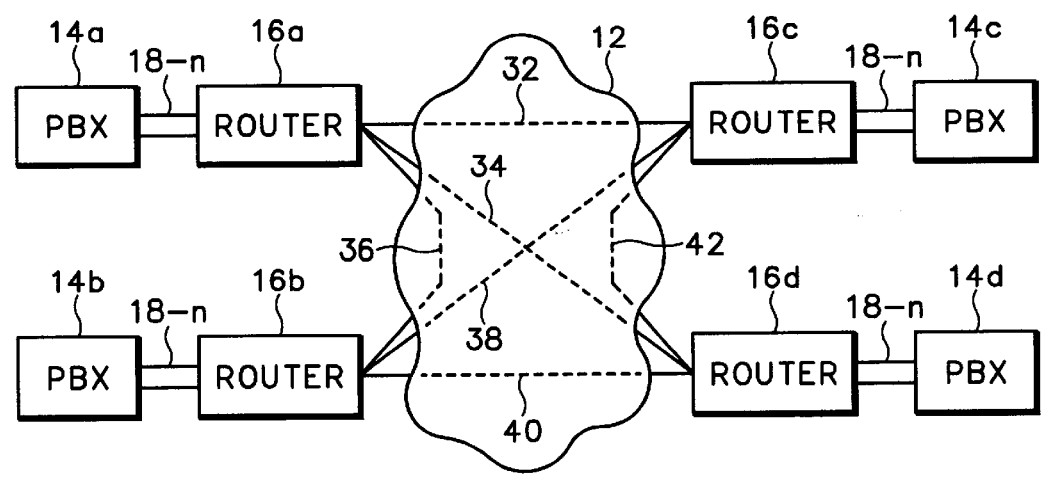
Figure 1D:
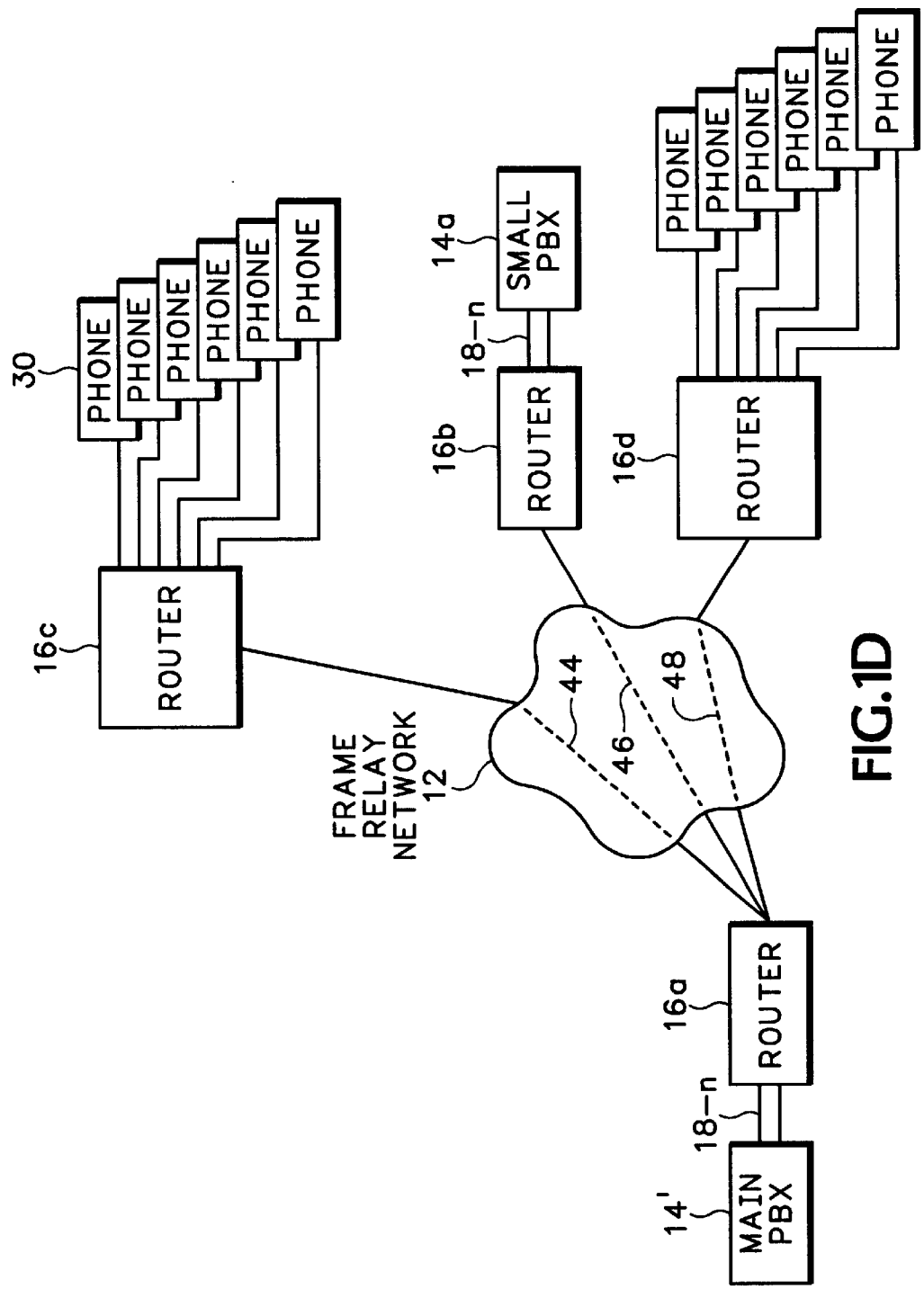
Figure 1B:
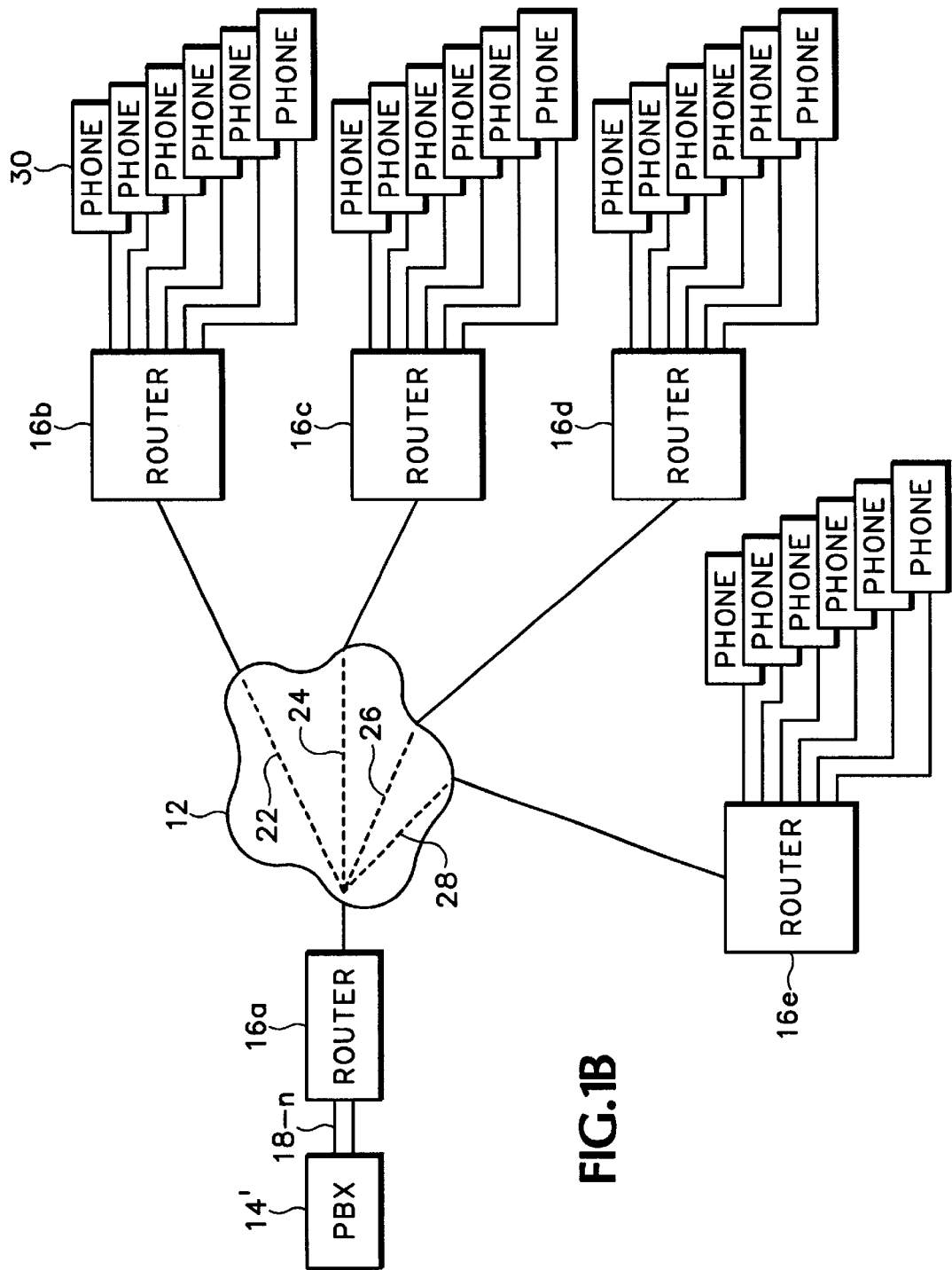

FIG. 1B a more complex form of the invented apparatus 10 where a T1/E1 connection exists only at a Main PBX 14'. The set of twenty-four channels 18-n is split (for illustration purposes only) into four sets 22, 24, 26, 28 of six channels each. Each set of six channels is carried in six FRF.11 sub-channels (not explicitly shown, for the sake of clarity) within one of four frame relay PVCs to a corresponding one of four destination routers 16b, 16c, 16d, 16e. Each destination router is directly connected to a set of phones (or analog subscriber lines, or equivalent) such as typical phone 30. Each destination router can condition the AIS for voice channels within its own set. Router 16a connected to Main PBX 14' is configured to assert the T1/E1 alarm if more than a programmable number of channels 22, 24, 26 and 28 has the AIS condition set.

FIG. 1C shows a more complex variation on the voice packet network system of FIG. 1A. In accordance with this embodiment of the invention, four PBXs 14a, 14b, 14c, 14d and four routers 16a, 16b, 16c, 16d form a connection mesh with four n channel T1/E1 s 18-n. As illustrated, the four T1/E1 s from the PBXs and through the routers are split into three sets of eight channels each, creating six frame relay PVC channels 32, 34, 36, 38, 40, 42 each utilizing eight FRF.11 sub-channels. Those of skill in the art will appreciate that if the alarm threshold is set to eight channels, then the alarm aggregation mechanism in accordance with the invention will replicate a T1/E1 alarm condition output by any one of the PBXs onto the other three PBXs.

FIG. 1D shows a more mixed variation of the system of FIG. 1A. FIG. 1D shows a main PBX 14' and T1/E1 connection 18-n via a first router 16a and a T1/E1 digital connected satellite small PBX 14a connected to a second router 16b. Remote locations having plural analog phones such as typical phone 30 are directly connected to each of two remote routers 16c, 16d. Three frame relay PVCs 44, 46, 48 interconnect routers 16a, 16b, 16c, 16d, as shown. PVC 44 carries six compressed voice channels using six FRF.11 sub-channels; PVC 46 carries twelve compressed voice channels utilizing twelve FRF.11 sub-channels; and PVC 48 carries six compressed voice channels utilizing six FRF.11 sub-channels. This configuration permits assertion of a T1/E1 alarm to main PBX 14' in the event that an AIS bit is detected in a defined (programmable) number of FRF.11 sub-channels.

Those of skill in the art will appreciate that invented apparatus 10 preferably is implemented in software residing at plural interconnect nodes such as within one or more routers 16. The software implementation in accordance with a preferred embodiment is straightforward yet flexible. The logic may be implemented by simply defining variables in memory that represent AIS bits and conditions; performing Boolean combinations such as AND functions thereon; and providing status information regarding the one or more connected trunk conditions to one or more connected interconnect nodes. Such trunking alarm aggregation reporting may utilize, for example, the FRF.11 specification or any other suitable supervisory communications protocol.

Figure 2:
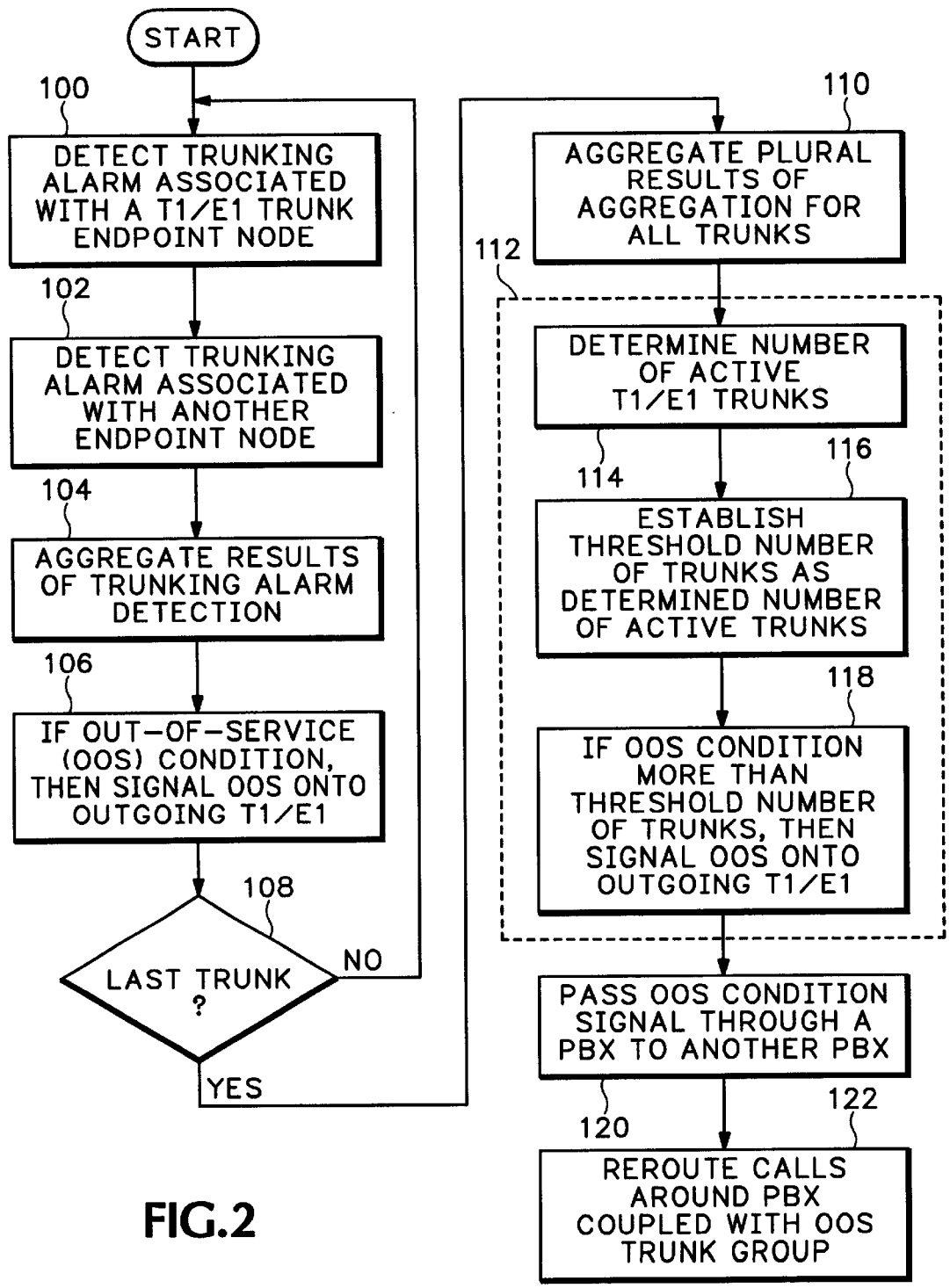
FIG. 2 is a flow chart illustrating the invented trunking alarm aggregation method.

FIG. 2 is a flow chart illustrating the invented trunking alarm aggregation method. The method is for use in a voice packet network having at least two connectable endpoint nodes with a trunk therebetween, in which there is a trunking alarm associated with each endpoint node, in accordance with the present invention. For example, the method finds particularly utility in applications that use a VoFR or similar protocol and/or comply with the FRF.11 specification. The method STARTs by first detecting at block 100 a trunking alarm associated with one of the endpoint nodes. The method further includes second detecting at block 102 a second trunking alarm associated with another of the endpoint nodes. Finally, the method includes first aggregating at block 104 the results of the first and second detecting. Such aggregating will be understood to assist in determining a condition of the trunk between the at least two connectable endpoint nodes.

Preferably, the first aggregating includes performing a logic combination, e.g. ANDing, of the first and second detecting results. For example, if the AIS bit is asserted at both endpoint nodes, then the aggregation of the results of detecting the two endpoint node alarms indicates an out-of-service (OOS) condition of the trunk therebetween. Thus, aggregating may be performed by a simple AND of two or more AIS bits representing an alarm condition two or more endpoint nodes. If an OOS condition is determined to exist for a given trunk, then at block 106 the method preferably further includes signaling such an OOS condition of the trunk onto an outgoing T1/E1 connection coupled with the trunk. Within the spirit and scope of the invention, such aggregation of the results of detecting the two endpoint node alarms to detect and signal an OOS condition of the trunk may be performed anywhere. For example, it may be performed by a dedicated aggregation mechanism that monitors the two endpoint AIS bits received thereby. In accordance with a preferred embodiment of the invention, however, it is performed by plural instances of software residing, for example, in plural PBXs 14 and/or plural routers 16.

Typically, as described above, a voice packet network includes plural ones of such connectable endpoint node pairs shown in FIGS. 1A through FIGS. 1D. Each such connectable endpoint node pair defines plural ones of such trunks 18-1, 18-2, . . . 18-n, with each trunk having a trunking alarm associated with each endpoint node pair. The trunking alarm associated with each endpoint node pair will be understood to be the result of aggregating, e.g. ANDing, the two AIS bits on either end of the trunk. In other words, the far end AIS bit is ANDed with a local AIS-like bit representing the condition of the local endpoint node at the local endpoint node to produce a logic combination representing the condition of the trunk therebetween.

Thus, those of skill in the art will appreciate that the proximate AIS bit in accordance with a preferred embodiment of the invention is not a bit received from a remote endpoint node in accordance with the FRF.11 specification, as such is a unidirectional signaling mechanism. Instead, what is referred to herein as the proximate AIS bit is a locally maintained AIS bit representing the alarm condition of the corresponding connection with the remote endpoint node. The proximate AIS bit thus may be thought of simply as a local copy of the AIS bit that is sent to the remote endpoint node in accordance with the FRF.11 specification.

The invented method typically involves repeating at block 108 the first and second detecting and first aggregating for each of the plural trunks. Those of skill in the art will appreciate that such may be accomplished by looping n times through blocks 100, 102, 104, 106 and 108.

When all trunking alarms within a trunk group have been detected, the invented method may be seen at block 110 to include second aggregating the plural results of the plural instances of the first aggregation. Such second aggregation also may be performed by forming a logic combination of, e.g. ANDing, or a numerical combination, e.g. counting, the plural associated trunk alarms. Thus, the second aggregation may be seen to assist in determining a condition of the plural trunks between plural connectable endpoint node pairs.

At block 112, it is determined whether the instances of the more than one trunks is greater than a predefined threshold number. Preferably, in accordance with the invention, this threshold number is programmable, e.g. the predefined threshold number is stored and maintained as a variable in memory associated with apparatus 10 at its resident node. At block 114, the number of active trunks on outgoing T1/E1 connection 18-n is determined. In accordance with the invention, the threshold number is programmed at block 116 to represent this determined number of active trunks. While n represents the number of trunks in a group, it will be appreciated that the number of active trunks in a given trunk group may be smaller than n. When the second aggregation determines an OOS condition of more than the threshold number of plural trunks, the invented method further includes selectively signaling at block 118 such an OOS condition of the more than one trunks onto an outgoing T1/E1 connection 18-n coupled with the trunk group.

Such signaling—whether of the alarm condition of a single endpoint node pair representing a single trunk or of the alarm condition of plural endpoint node pairs representing a trunk—group preferably is performed by asserting an alarm. The alarm may take any suitable form, within the spirit and scope of the invention. Preferably, the alarm takes the form of an asserted AIS bit in accordance with the FRF.11 specification.

If all of the active trunks of a given trunk group are in an alarm condition, as determined in accordance with the invention by aggregation of alarm conditions at all affected nodes, trunk group-wide, then it is concluded that the trunk group is out of service. Typically, the plural OOS trunks of the OOS trunk group represent a T1/E1 connection between two PBXs 14, as described above in relation to FIGS. 1A and 1C. Accordingly, at block 120 the signaling of the prevailing OOS condition of the more than one trunks 18-1, 18-2, . . . 18m (wherein m≦n) that are active but out of service is passed through one of the PBXs to the other of the PBXs. At block 122, responsive to such selective signaling, the other of the PBXs reroutes calls around the one of the PBXs coupled with the OOS trunk group.

Thus, it may be seen that in accordance with the invention remedial action may be taken to overcome an impairment of a voice packet network resource such as may be represented by a T1/E1 connection or trunk group OOS condition for so long as the OOS condition prevails. Thereafter, i.e. when the OOS condition is removed as by repair or software maintenance, the alarms will be de-asserted and full service of network 10 may be restored. The invention thus provides a flexible, preferably software-based network performance enhancement mechanism by aggregating trunking alarms and conditioning PBXs within the network to reroute voice traffic within the impaired network.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. In a voice packet network having plural connectable endpoint nodes with plural trunks therebetween and a trunking alarm associated with each endpoint node, an alarm aggregation method comprising:

detecting a first trunking alarm for each of the plural trunks associated with one of the endpoint nodes;

detecting a second trunking alarm for each of the plural trunks associated with another of the endpoint nodes occurring during a period of time of the first trunking alarm;

aggregating the first and second alarm condition to assist in determining a condition of the plural trunks between the plural connectable endpoint;

selectively signaling an out-of-service condition of more than one of the plural trunks onto an outgoing T1/E1 connection coupled to the trunk by asserting an alarm; and determining if a number of the plural trunks for which an out-of-service condition is signaled is greater than a predefined threshold.

2. The method of claim 1, wherein said aggregating includes performing a logic combination of the results of said first and second detecting.

3. The method of claim 1 which, in the case where said aggregating assists in determining an out-of-service condition of the trunk, further comprises:

signaling such an out-of-service condition of the trunk onto an outgoing T1/E1 connection coupled with the trunk.

4. The method of claim 1, wherein the predefined threshold number of trunks is programmable.

5. The method of claim 4 which further comprises:

determining the number of active trunks on the outgoing T1/E1 connection, wherein the predefined threshold number of trunks is based upon the determined number of active trunks.

6. The method of claim 1 in which the plural trunks represent a T1/E1 connection between two PBXs, wherein said selective signaling of the out-of-service condition of the more than one trunks is passed through one of the PBXs to the other of the PBXs.

7. The method of claim 6, wherein the other of the PBXs, responsive to said selective signaling of the out-of-service condition of the more than one trunks, reroutes calls around the one of the PBXs.

8. Apparatus for alarm aggregation and conditioning of a voice T1/E1 connection within a network, the apparatus comprising:

first means for detecting a trunking alarm for each of plural trunks associated with an endpoint nodes pair;

second means for detecting a second trunking alarm for each of plural trunks associated with another of the endpoint nodes pair; and means for aggregating the first and second alarm condition to assist in determining a condition of the plural trunks between the connectable endpoint pairs;

means for selectively signaling an out-of-service condition of more than one of the plural trunks onto an outgoing T1/E1 connection coupled to the trunk by asserting an alarm; and means for determining if a number of the plural trunks for which an out-of-service condition is signals is greater than a predefined threshold.

9. The apparatus of claim 8 which, in the case where said aggregating means assists in determining an out-of-service condition of more than one of the plural trunks, further comprises:

means for selectively signaling such an out-of-service condition of the more than one trunks onto an outgoing T1/E1 connection coupled with the trunk.

10. A computer-readable medium containing a program for aggregating alarms in a voice packet network, the program comprising:

instructions for first detecting a trunking alarm for each of plural trunks associated with one of at least two connectable endpoint nodes by way of a trunking alarm associated with the endpoint node;

instructions for second detecting a second trunking alarm for each of plural trunks associated with another of the endpoint nodes by way of a trunking alarm associated with the other endpoint node;

instructions for aggregating the first and second alarm condition to assist in determining a condition of the plural trunks between the connectable endpoint nodes;

instructions for selectively signaling an out-of-service condition of more than one of the plural trunks onto an outgoing T1/E1 connection coupled to the trunk by asserting an alarm; and instructions for determining if a number of the plural trunks for which an out-of-service condition is signals is greater than a predefined threshold.

11. The computer-readable medium in accordance with claim 10, in the case where said aggregating means assists in determining an out-of-service condition of the trunk, wherein the program further comprises:

instructions for signaling such an out-of-service condition of the plural trunks onto an outgoing T1/E1 connection coupled with the trunk.

* * * * *

UNITED STATES PATENT AND TRADEMARK OFFICE
CERTIFICATE OF CORRECTION

PATENT NO.   : 6,810,016 B1
DATED        : October 26, 2004
INVENTOR(S)  : Sun et al.

It is certified that error appears in the above-identified patent and that said Letters Patent is hereby corrected as shown below:

Column 3,
Line 53, replace "logical predicates, for" with -- logical predicates for --.

Column 4,
Line 43, replace "channels 22, 24, 26, and 28" with -- channels 28, 30, 32, and 34 --.
Lines 43 and 49, replace "T1/E1 s" with -- T1/E1s --.

Column 8,
Lines 13 and 17, replace "endpoint nodes" with -- endpoint node --.

Signed and Sealed this

Twenty-first Day of February, 2006

JON W. DUDAS
*Director of the United States Patent and Trademark Office*